US012589955B2

(12) United States Patent
Won et al.

(10) Patent No.: US 12,589,955 B2
(45) Date of Patent: Mar. 31, 2026

(54) TRANSFER DEVICE COMPRISING AUTOMATIC OPENING UNIT OF BOX COVER

(71) Applicant: LG Energy Solution, Ltd., Seoul (KR)

(72) Inventors: Seung Jae Won, Daejeon (KR); Byeong Oh Jeong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 302 days.

(21) Appl. No.: 18/580,023

(22) PCT Filed: Feb. 7, 2023

(86) PCT No.: PCT/KR2023/001696
§ 371 (c)(1),
(2) Date: Jan. 17, 2024

(87) PCT Pub. No.: WO2023/153751
PCT Pub. Date: Aug. 17, 2023

(65) Prior Publication Data
US 2024/0343506 A1     Oct. 17, 2024

(30) Foreign Application Priority Data
Feb. 8, 2022     (KR) ........................ 10-2022-0016471

(51) Int. Cl.
*B65G 65/00*          (2006.01)
*B66F 9/02*           (2006.01)

(52) U.S. Cl.
CPC .............. *B65G 65/005* (2013.01); *B66F 9/02* (2013.01); *B65G 2203/0216* (2013.01); *B65G 2203/0233* (2013.01); *B65G 2203/042* (2013.01)

(58) Field of Classification Search
CPC ............ B65G 65/005; B65G 2201/025; B65G 2203/0216; B65G 2203/0233; B65G 2203/042
See application file for complete search history.

(56) References Cited

U.S. PATENT DOCUMENTS 5,738,484 A      4/1998  Taylor
2025/0304373 A1* 10/2025  Lindbo ................ B65G 1/1371

FOREIGN PATENT DOCUMENTS

CN        110802391 B    11/2021
JP        H0748004 A      2/1995
(Continued)

OTHER PUBLICATIONS

Extended European Search Report for Application No. 23753101.7 dated Mar. 10, 2025. 7 pages.
(Continued)

*Primary Examiner* — Saul Rodriguez
*Assistant Examiner* — Brendan P Tighe
(74) *Attorney, Agent, or Firm* — Lerner David LLP

(57) ABSTRACT

A transfer device comprising an automatic opening unit of a box cover, the transfer device includes: a barcode reader for reading a barcode attached to a box accommodating a bobbin and having a cover; a conveyor unit for placing the box; a centering unit; a fork unit for chucking the cover of the box; a traveling drive unit; and a control unit. The control unit controls Z-axis centering of the fork unit in conjunction with the barcode reader and the distance sensor, X-axis centering of the fork unit in conjunction with the box detection sensor, and Z-axis elevation and Y-axis movement of the fork unit, respectively, to automatically control opening of the cover.

11 Claims, 11 Drawing Sheets

(56)         References Cited

FOREIGN PATENT DOCUMENTS

| | | | |
|---|---|---|---|
| JP | H09142408 | A | 6/1997 |
| JP | 2000142911 | A | 5/2000 |
| JP | 2002338006 | A | 11/2002 |
| KR | 20170133994 | A | 12/2017 |
| KR | 101998618 | B1 | 7/2019 |
| KR | 20210028381 | A | 3/2021 |
| KR | 20210061488 | A | 5/2021 |

OTHER PUBLICATIONS

International Search Report for PCT/KR2023/001696 mailed May 16, 2023.3 pages.

* cited by examiner

[Figure 1a]
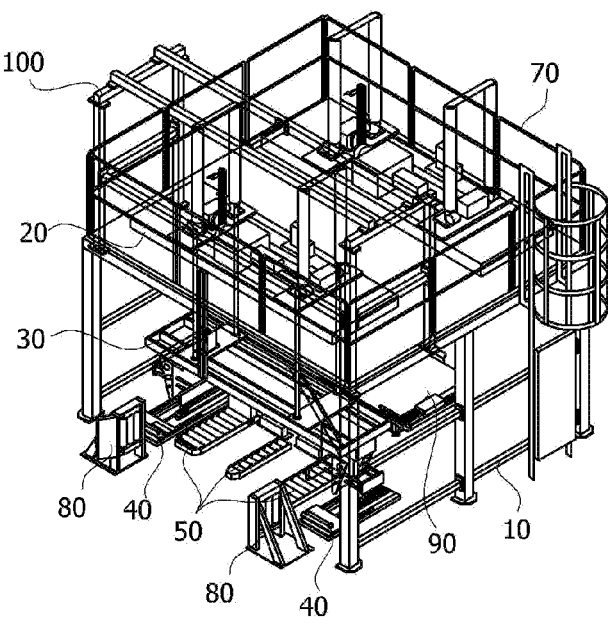
[Figure 1b]
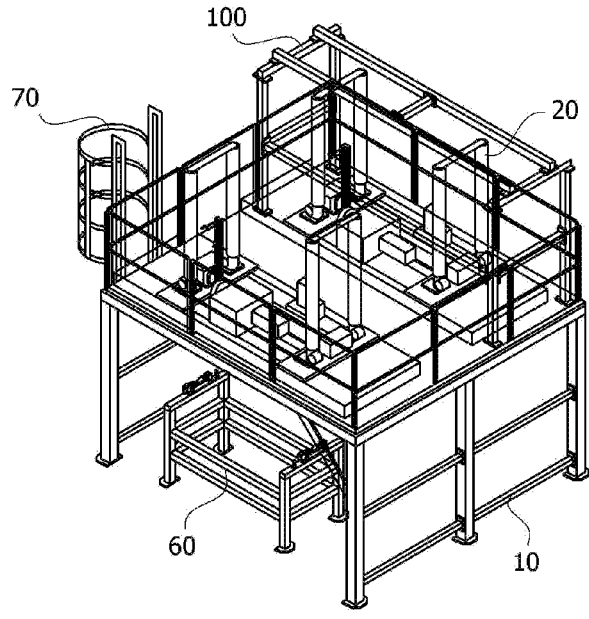

[Figure 2a]
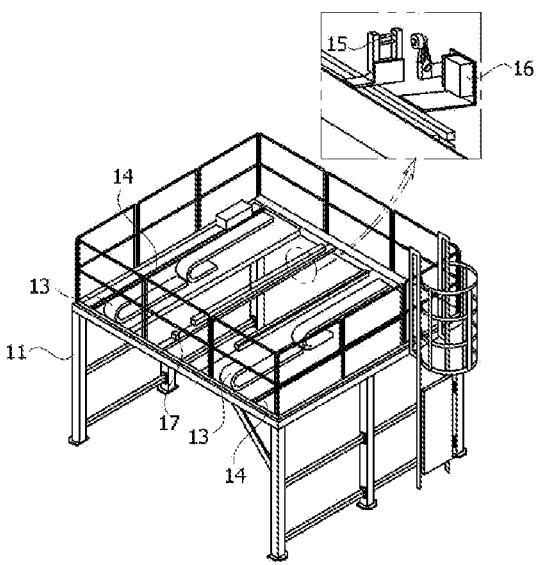
[Figure 2b]
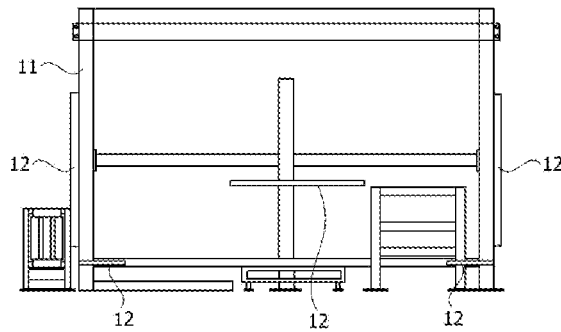
[Figure 3a]
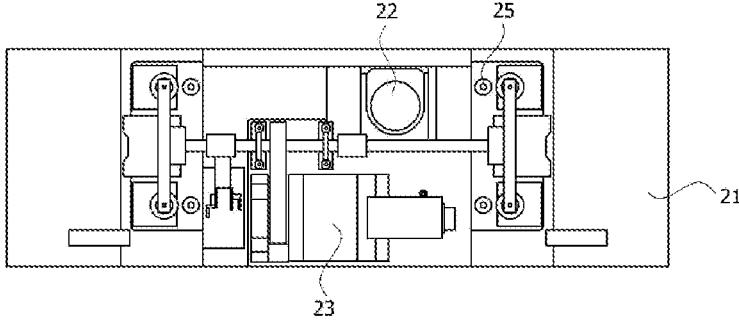

[Figure 3b]
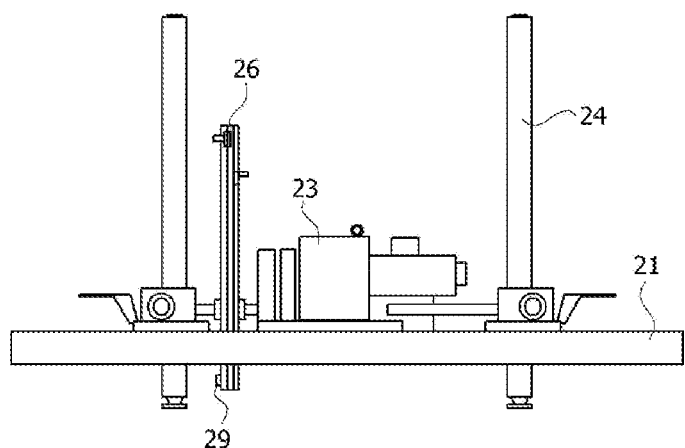
[Figure 3c]
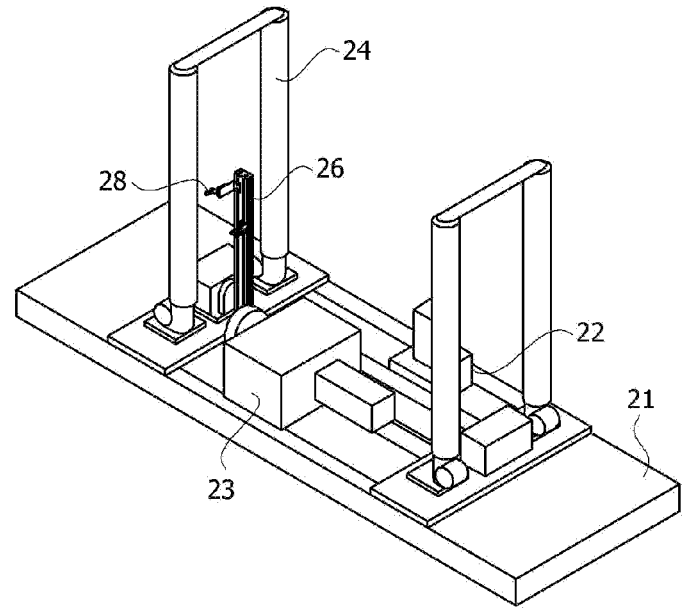

[Figure 3d]
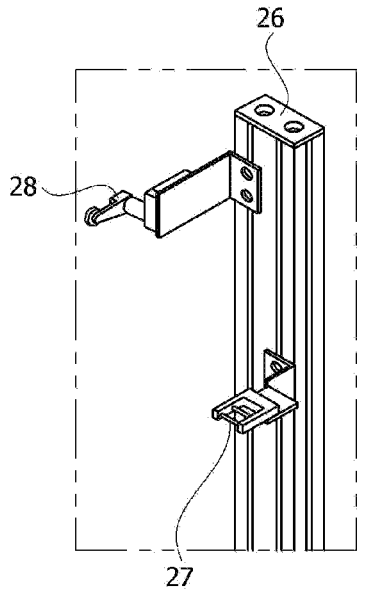
[Figure 4a]
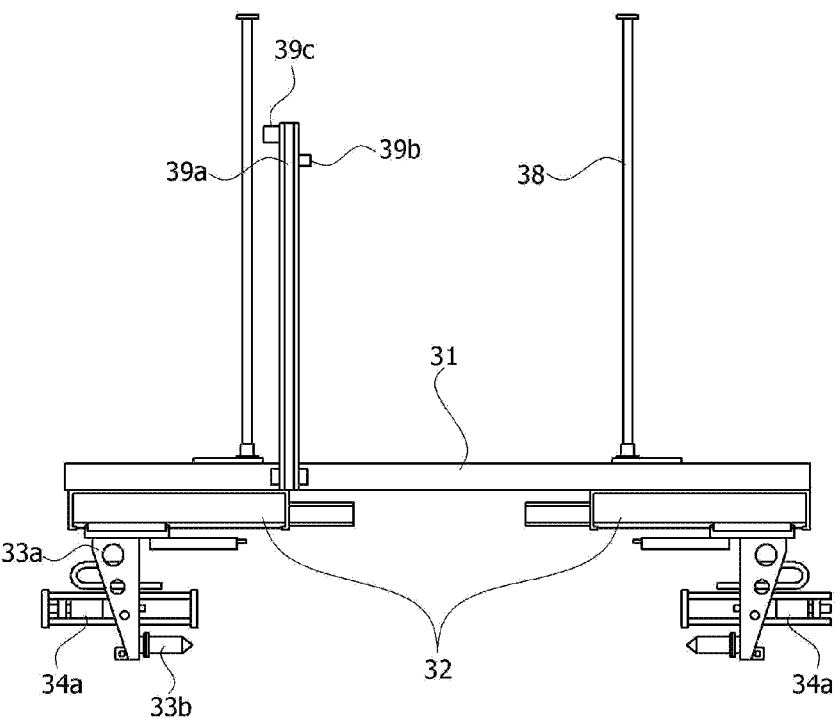

[Figure 4b]
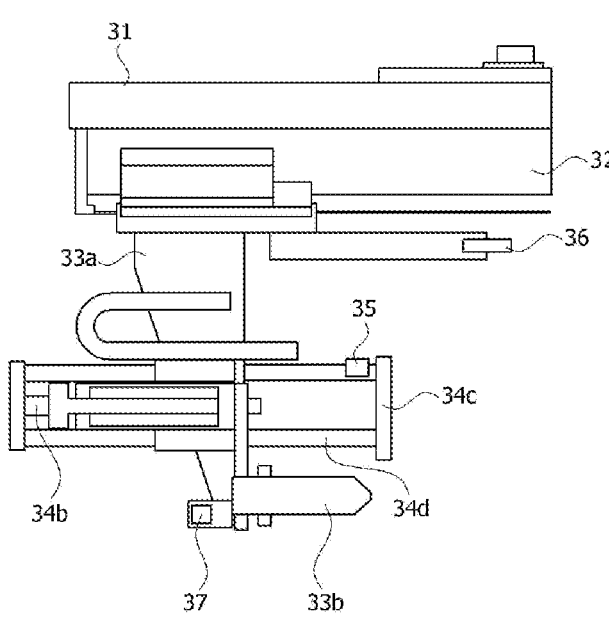
[Figure 4c]
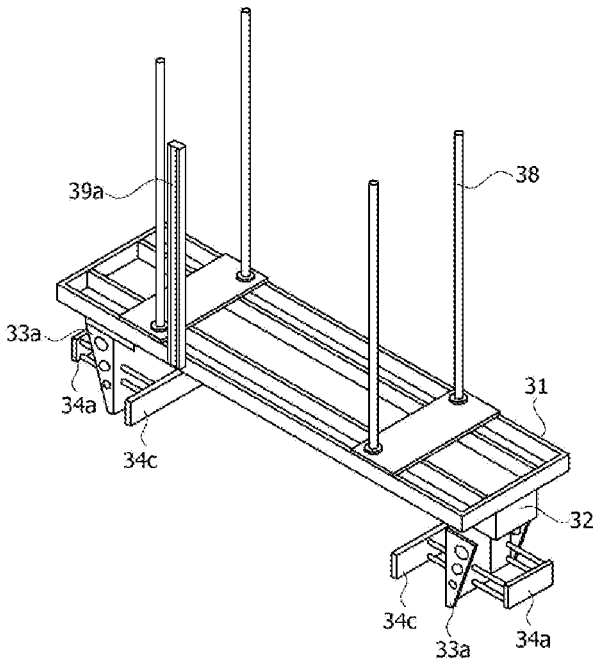

[Figure 5a]
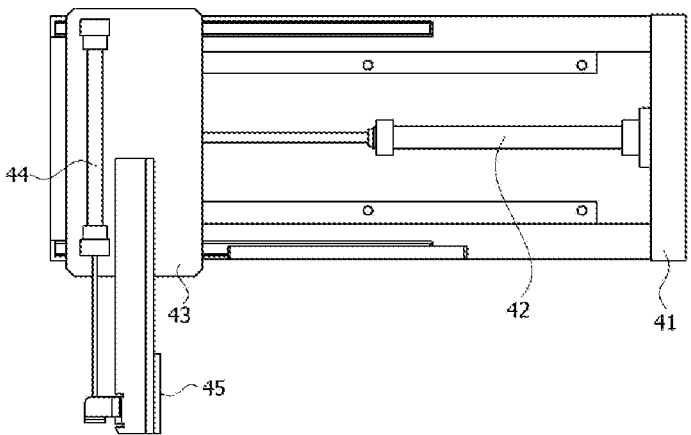
[Figure 5b]
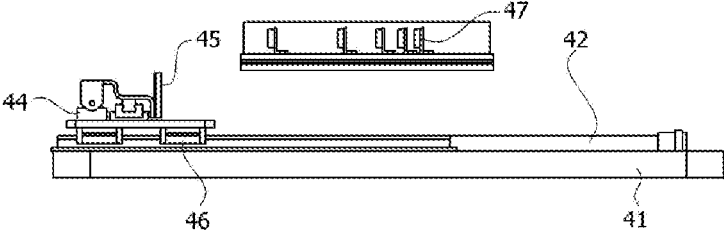
[Figure 5c]
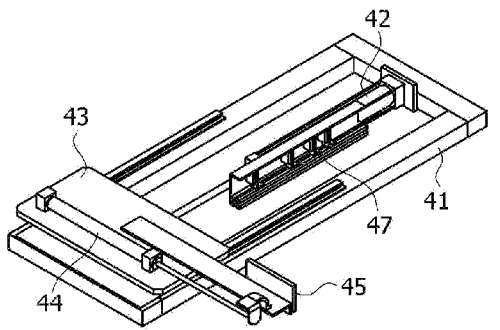

[Figure 6]
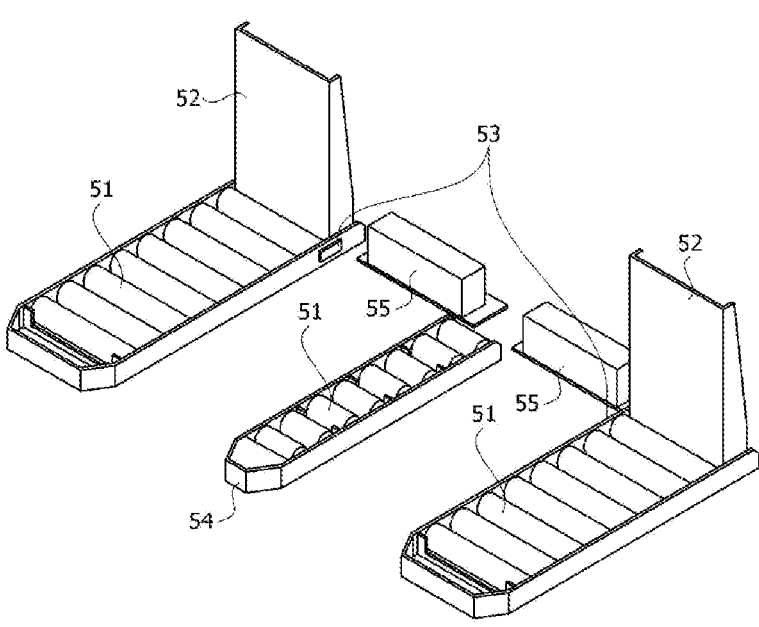
[Figure 7a]
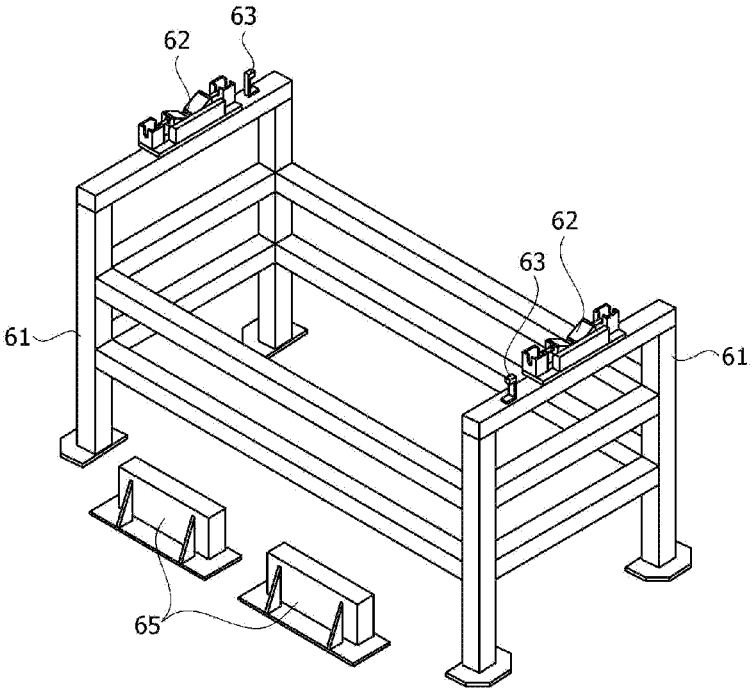

[Figure 7b]
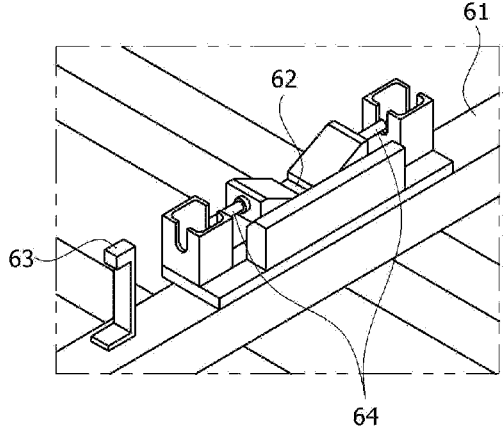
[Figure 8]
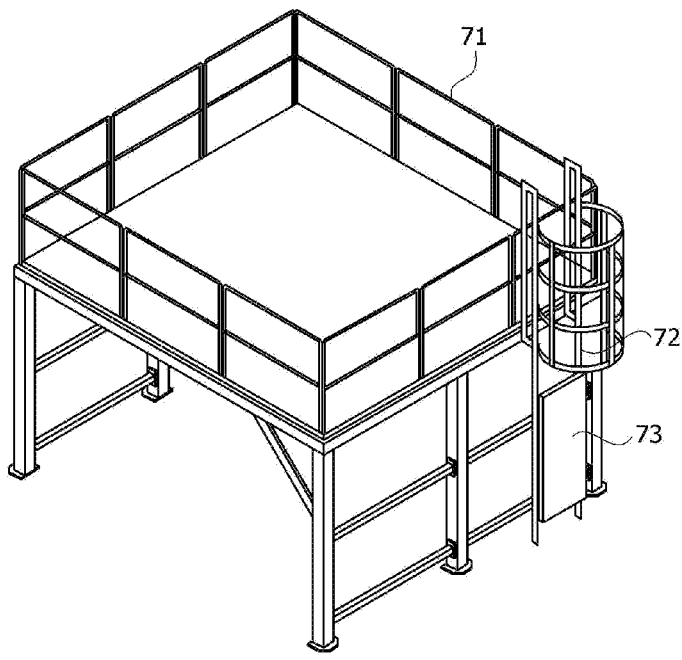

[Figure 9]
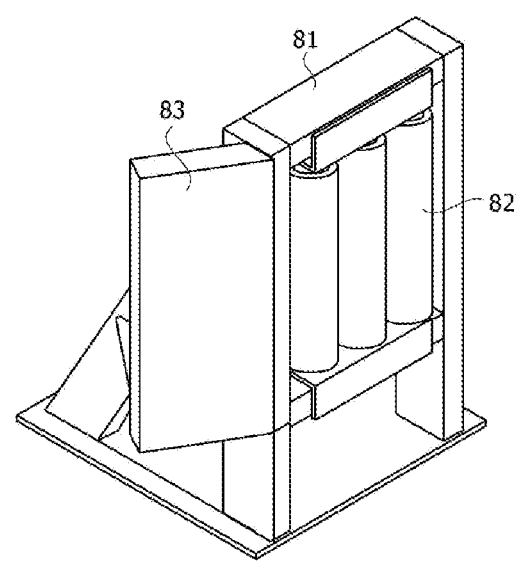
[Figure 10]
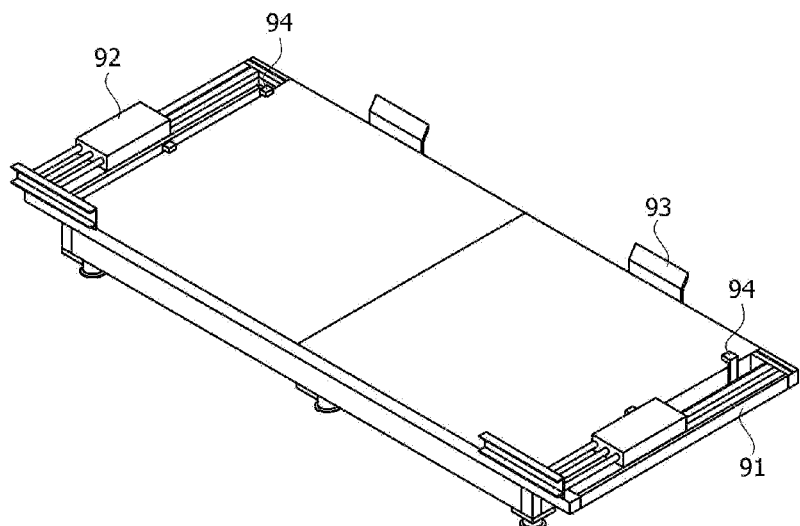

[Figure 11]
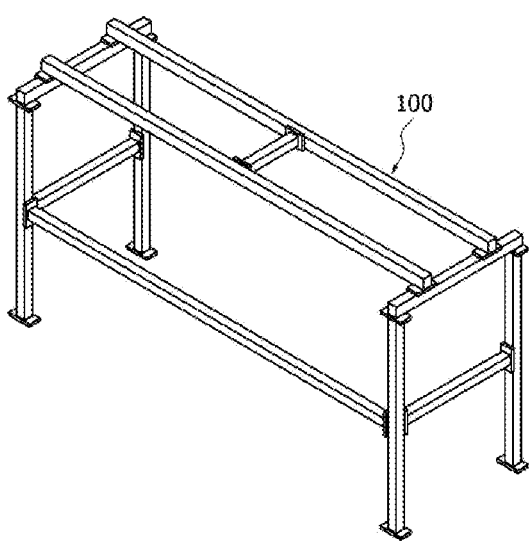
[Figure 12a]
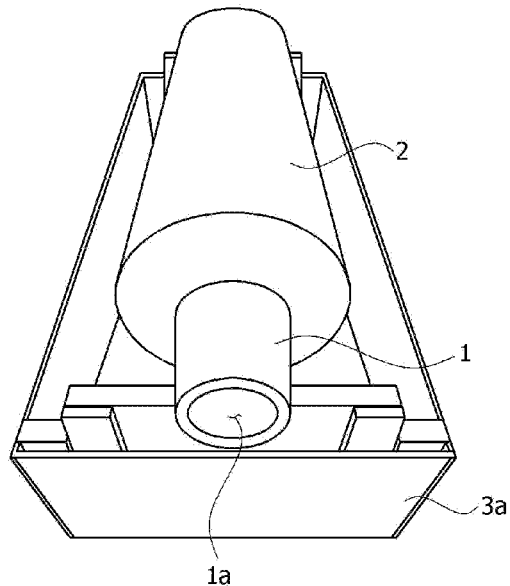

[Figure 12b]
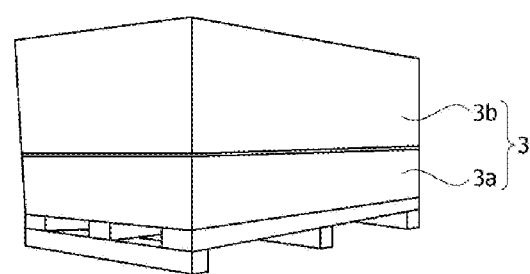

TRANSFER DEVICE COMPRISING AUTOMATIC OPENING UNIT OF BOX COVER

CROSS-REFERENCE TO RELATED APPLICATIONS

The present application is a national phase entry under 35 U.S.C. § 371 of International Application No. PCT/KR2023/001696, filed on Feb. 7, 2023, which claims priority from Korean Patent Application No. 10-2022-0016471, filed on Feb. 8, 2022, all of which are incorporated herein by reference.

TECHNICAL FIELD

The present disclosure relates to a transfer device, which relates, particularly, to a transfer device comprising an automatic opening unit of a box cover.

BACKGROUND ART

To lift a cover of a box loaded with raw materials such as foils, it must be lifted manually by a group of two workers from both sides.

DISCLOSURE

Technical Problem

Therefore, it is an object of the present invention to provide a transfer device automatically opening a cover by adding an automatic box cover opening unit to a transfer device facility.

Technical Solution

In order to achieve the above-described object, the present disclosure provides a transfer device comprising: a barcode reader for reading a barcode attached to a box accommodating a bobbin loaded with raw materials, and having a cover: a conveyor unit for placing the box; a centering unit installed outside the conveyor unit and adjusting the position of the box in the X-axis direction corresponding to the width direction or the lateral direction and the Y-axis direction corresponding to the longitudinal direction or the traveling direction; a fork unit installed on the upper part of the conveyor unit, chucking the cover of the box in the X-axis direction, and provided with a box cover cylinder for movement in the X-axis direction when the cover is chucked, a box detection sensor for sensing the cover, and a distance sensor for sensing a distance to the cover; a traveling drive unit connected to the fork unit at the top of the fork unit, elevating the fork unit in the Z-axis direction corresponding to the height direction or the elevating direction, and moving the fork unit in the Y-axis direction; and a control unit for controlling Z-axis centering of the fork unit in conjunction with the barcode reader and the distance sensor, X-axis centering of the fork unit in conjunction with the box detection sensor, and Z-axis elevation and Y-axis movement of the fork unit, respectively, to automatically control opening of the cover.

In an aspect of the present invention, the conveyor unit may comprise: a free roller lane for moving the box in the Y-axis direction; a box stopper installed at the rear end of the Y-axis of the free roller lane for Y-axis centering of the box; a cargo alignment sensor disposed adjacent to the box stopper to check whether the box is positioned in contact with the box stopper; an entry guide block installed at the front end of the Y-axis of the free roller lane to guide the entry path of a transport vehicle; and a transport vehicle end stopper disposed adjacent to the box stopper to prevent a collision between transport vehicles.

In an aspect of the present invention, the centering unit may comprise: a box pusher contacting the box for centering the box; an X-axis cylinder (or first cylinder) connected to the box pusher to move the box pusher in the X-axis direction: a moving plate on which the X-axis cylinder is installed; a Y-axis cylinder (or second cylinder) connected to the moving plate to move the box pusher in the Y-axis direction; an LM (linear motion) guide connected to the moving plate to guide movement of each axis direction; a centering unit frame in which the Y-axis cylinder is installed; and a size check sensor installed on the upper part of the centering unit frame to check the size of the box.

In an aspect of the present invention, the fork unit may comprise: a fork unit frame having a plate-like structure; an orthogonal robot provided with a motor, and installed on the lower part of the fork unit frame to be movable in the X-axis direction; a fork arm installed on the lower part of the orthogonal robot; a fork installed inside the lower end of the fork arm to chuck the bobbin; a box cover cylinder provided with a cylinder rod disposed outside the fork arm, a cover pusher disposed inside the fork arm, and a connecting member connecting the cylinder rod and the cover pusher; the box detection sensor installed on the connecting member of the box cover cylinder; a distance sensor installed on the lower part of the orthogonal robot to the inside of the fork arm; a chucking sensor installed at the lower end of the fork arm; an elevating guide shaft installed on the upper part of the fork unit frame; a sensor support installed toward the upper part of the fork unit frame; and an elevating regular position sensor and an elevating limit sensor installed on the sensor support.

In an aspect of the present invention, the traveling drive unit comprises: a traveling drive unit frame having a plate-like structure; a traveling motor for movement in the Y-axis direction installed on the upper part of the traveling drive unit frame; a elevating motor for movement in the Z-axis direction installed on the upper part of the traveling drive unit frame; a rack jack installed in the traveling drive unit frame in the Z-axis direction to enable elevation, converting rotation of the elevating motor into linear motion, and connected to the fork unit to elevate the fork unit; an elevating guide bush installed in the traveling drive unit frame, and inserted by an elevating guide shaft of the fork unit; a sensor support installed in the traveling drive unit frame in the Z-axis direction; and an elevating regular position sensor and an elevating limit sensor installed on the sensor support.

The transfer device according to an aspect of the present invention may further comprise a main frame unit; wherein the main frame unit may comprise: a three-dimensional main frame; a light curtain sensor installed on the side of the main frame to be interlocked during lower maintenance; a cableveyor installed on the upper part of the main frame to guide cables; an LM guide installed on the upper part of the main frame and connected to the traveling drive unit frame to guide the traveling direction of the traveling drive unit frame; and a traveling regular position sensor and a traveling limit sensor installed on the upper part of the main frame.

The transfer device according to an aspect of the present invention may further comprise a bobbin stacking stand installed at the rear end of the Y-axis of the main frame unit to place the bobbin thereon; wherein the bobbin stacking stand may comprise: a three-dimensional stacking stand frame; a guide block installed on the upper part of the stacking stand frame to prevent the bobbin from being pushed in the axial direction; a cargo detection sensor installed on the upper part of the stacking stand frame to determine whether the bobbin is present in the stacking stand; a bobbin detection sensor installed on the guide block to determine whether the bobbin is present in the guide block; and a transport vehicle end stopper installed toward the rear end of the Y-axis of the stacking stand frame to prevent a collision between the transport vehicle and the stacking stand.

The transfer device according to an aspect of the present invention may further comprise a cover assembly installed on the top and side surfaces of the main frame unit; wherein the cover assembly may comprise: a three-dimensional cover assembly frame; a ladder installed on the side surface of the cover assembly frame to provide a movement path during upper maintenance; and a safety door installed on the side surface of the cover assembly frame.

The transfer device according to an aspect of the present invention may further comprise an entry guide installed at the entrance of the main frame unit to guide the path of the transport vehicle when the box is input: wherein the entry guide may comprise: a three-dimensional entry guide frame; a roller installed in the Z-axis direction inside the entry guide frame to prevent friction between the transport vehicle and the entry guide; and a pad installed toward the front end of the entry guide frame to prevent damage to the transport vehicle and the entry guide.

The transfer device according to an aspect of the present invention may further comprise a maintenance frame installed on the upper part of the main frame unit to be for mounting the motor during maintenance.

The transfer device according to an aspect of the present invention may further comprise a box cover stacking stand installed at the rear end of the Y-axis of the conveyor unit; wherein the box cover stacking stand may comprise: a stacking stand frame having a plate-like structure; centering cylinders installed at both ends of the stacking stand frame in the X-axis direction to center the cover in the Y-axis direction; an end bracket installed at the rear end of the stacking stand frame in the Y-axis direction to be used for Y-axis centering of the cover; and seating detection sensors installed at both ends of the stacking stand frame in the X-axis direction to check the regular position of the cover.

Advantageous Effects

By automating the opening of the box cover using the transfer device according to an aspect of the present invention, the number of workers can be reduced. In an aspect of the present invention, automation can be performed, from opening the box cover to transferring the bobbin in the process of manually opening the box cover, and then transferring the bobbin.

DESCRIPTION OF DRAWINGS

FIGS. 1a and 1b show the overall configuration of the transfer device according to an embodiment of the present invention.

FIGS. 2a and 2b show the main frame unit configuration of the transfer device according to an embodiment of the present invention.

FIGS. 3a, 3b, 3c, and 3d show the configuration of the traveling drive unit of transfer device according to an embodiment of the present invention.

FIGS. 4a, 4b, and 4c show the fork unit configuration of the transfer device according to an embodiment of the present invention.

FIGS. 5a, 5b, and 5c show the centering unit configuration of the transfer device according to an embodiment of the present invention.

FIG. 6 shows the conveyor unit configuration of the transfer device according to an embodiment of the present invention.

FIGS. 7a and 7b show the bobbin stacking stand configuration of the transfer device according to an embodiment of the present invention.

FIG. 8 shows the cover assembly configuration of the transfer device according to an embodiment of the present invention.

FIG. 9 shows the entry guide configuration of the transfer device according to an embodiment of the present invention.

FIG. 10 shows the box cover stacking stand configuration of the transfer device according to an embodiment of the present invention.

FIG. 11 shows the maintenance frame configuration of the transfer device according to an embodiment of the present invention.

FIGS. 12a and 12b show a foil, a bobbin, and a box.

DETAILED DESCRIPTION

Hereinafter, embodiments of the present invention will be described in detail with reference to the accompanying drawings.

Referring to FIGS. 1a and 1b, when the transfer device according to an embodiment of the present invention is largely divided, it may be composed of a main frame unit (10), a traveling drive unit (20), a fork unit (30), a centering unit (40), a conveyor unit (50), a bobbin loading stand (60), a cover assembly (70), an entry guide (80), a box cover loading stand (90), a maintenance frame (100), a barcode reader, a control unit, and the like.

The transfer device according to an embodiment of the present invention may be used to transfer raw materials. The raw material may be, for example, foils, films, and the like made of metal, plastic, and the like, which may be, for example, a metal foil, a plastic film, and the like. The foil may be, for example, a foil used in a battery (for automobiles, etc.), and specifically, the foil may be a foil used as a substrate (current collector) of an electrode (positive electrode, negative electrode), and may be, more specifically, a copper (Cu) foil (negative electrode) and an aluminum (Al) foil (positive electrode), and the like.

Referring to FIG. 12a, the foil (2) may be transferred in a state of being wound around the bobbin (1) in a roll form. Even in the case of a film, it may be transferred in a state of being wound around the bobbin (1) in a roll form. The bobbin (1) may be composed of a hollow cylindrical structure, and both ends of the bobbin (1) may be open hollow ends (1a), and as the forks (33b) of the fork unit (30) are inserted to these hollow ends (1a), the fork unit (30) may chuck the bobbin (1).

The bobbin (1) around which the foil (2) is wound may be accommodated (loaded) in the box (3). The box (3) may be, for example, a wooden box made of wood, and may also be made of metal, plastic, paper material, or the like.

Referring to FIG. 12b, the box (3) may comprise a lower box body (3a) and an upper box cover (3b). The box body (3a) may have a hexahedral structure with an inner space and an open top, and the box cover (3b) may have a hexahedral structure with an inner space and an open bottom. A groove on which the bobbin (1) is placed may be formed at the upper end of the box body (3a). After the bobbin (1) around which the foil (2) is wound is placed on the box body (3a), the box body (3a) may be covered with the box cover (3b), and then it may be transferred in this packing box state.

In the drawings, the X-axis may be the width direction or the lateral direction of the transfer device. The Y-axis may be the longitudinal direction or the traveling direction of the transfer device. The Z-axis may be the height direction or the elevating direction of the transfer device. In FIG. 1a, the front end of the Y-axis represents the front (forward), and the rear end of the Y-axis represents the rear (backward). Conversely, in FIG. 1b, the front represents the rear end of the Y-axis. The size of the transfer device is not particularly limited, which may be appropriately set, and particularly, the length of the transfer device may be very long as needed, unlike the drawings.

Referring to FIGS. 2a and 2b, the main frame unit (10) may be composed of a main frame (11), a light curtain sensor (12), a cableveyor (13), an LM guide (14), a traveling regular position sensor (15), and traveling limit sensors (16, 17), and the like.

The main frame (11) forms a basic skeleton, which may consist of a three-dimensional structure in the form of a hexahedron, and may have a size close to the overall size of the transfer device.

The light curtain sensor (12) may be installed on the side surface of the main frame (11) to be interlocked during lower maintenance. Among the side surfaces of the main frame (11), for example, as shown in FIG. 2b (side view), the light curtain sensors (12) may be installed at 5 locations, respectively, that is, one in the Z-axis direction at the front end, one in the Y-axis direction at the lower end toward the front end, one in the Y-axis direction toward the center, one in the Y-axis direction at the lower end toward the rear end, and one in the Z-axis direction at the rear end. The light curtain sensor (12) is a kind of safety sensor, and when a worker or the like is sensed by this sensor, the operation of the transfer device may be temporarily stopped.

The cableveyor (13) may be installed on the upper part of the main frame (11) to guide cables. The cableveyors (13) may be installed in the Y-axis direction on both sides of the upper part of the main frame (11).

The LM guide (14) may be installed on the upper part of the main frame (11), and may be connected to the traveling drive unit frame (21) to guide the traveling direction of the traveling drive unit (20). The LM guides (14) may be installed on both sides of the cableveyors (13) in the Y-axis direction, and may be connected to the lower part of the traveling drive unit frame (21).

The traveling regular position sensor (or traveling origin sensor) (15) may be installed on the upper part of the main frame (11) to confirm the origin operation or operation completion of the traveling drive unit (20). The traveling regular position sensor (15) may be installed toward the rear end of the support at the center from the upper part of the main frame (11). The traveling regular position sensor (15) may be a horseshoe sensor.

The traveling limit sensors (16, 17) may be installed on the upper part of the main frame (11) to stop the traveling drive unit (20) while generating an alarm when the limit thereof is exceeded. The traveling limit sensors (16, 17) may be composed of a traveling backward limit sensor (16) and a traveling forward limit sensor (17), where they may be installed toward the rear end and toward the front end of the support at the center from the upper part of the main frame (11), respectively. The traveling limit sensor (16, 17) may be a limit switch sensor.

Referring to FIGS. 3a, 3b, 3c, and 3d, the traveling drive unit (20) may be composed of a traveling drive unit frame (21), a traveling motor (22), an elevating motor (23), a rack jack (24), an elevating guide bush (25), a sensor support (26), an elevating regular position sensor (27), elevating limit sensors (28, 29), and the like.

The traveling drive unit (20) itself may move in the Y-axis direction, and may also be connected to the fork unit (30) at the top of the fork unit (30), and elevate the fork unit (30) in the Z-axis direction, and reciprocate it in the Y-axis direction.

The traveling drive unit frame (21) forms a basic skeleton, which may consist of a rectangular plate-like structure, and reciprocate in the Y-axis direction as its lower part is connected to the LM guide (14) of the main frame unit (10).

The traveling motor (22) may be a traveling motor for movement in the Y-axis direction installed on the upper part of the traveling drive unit frame (21). Although not shown in the drawings, the rotating shaft of the traveling motor (22) may be connected to one of a pair of pulleys (or gears) through an appropriate power transmission mechanism, and a belt (or chain) may be wound around the pair of pulleys to be rotated, and the belt may be directly or indirectly connected to the traveling drive unit frame (21). The pair of pulleys may be disposed toward the front and rear ends of the Y-axis, respectively, and may be fixed to the main frame unit (10), and the like. The belt may be disposed long in the Y-axis direction. By forward-direction and reverse-direction rotation of the pulley and the belt, the traveling drive unit frame (21) may reciprocate in the Y-axis direction. In addition to these pulley and belt mechanisms, other driving mechanisms, for example, cylinder and piston (or rod) mechanisms, rack and pinion mechanisms, and the like may also be used.

The elevating motor (23) may be an elevating motor for movement in the Z-axis direction installed on the upper part of the traveling drive unit frame. Referring to FIG. 3a, the rotating shaft of the elevating motor (23) may be connected to the rack jack (24) through an appropriate power transmission mechanism (belt/chain, pulley/gear, rotating shaft, reduction gear, pinion gear, etc.).

The rack jack (24) may be installed on the traveling drive unit frame (21) in the Z-axis direction to enable elevation, convert the rotation of the elevating motor (23) into linear motion, and be connected to the fork unit (30) to elevate the fork unit (30). The rack jack (24) is a rack gear, which may be engaged with a pinion gear to allow linear motion in the Z-axis direction. The rack jack (24) may be composed of a total of 4, with one pair on both sides in the X-axis direction, where the upper part of the pair of rack jacks (24) may be connected through a connecting member. The lower end of the rack jack (24) may be connected to the upper end of the fork unit frame (31) of the fork unit (30). In FIGS. 3b & 3c, the rack jack (24) is in a state of being raised to the maximum height.

The elevating guide bush (25) may be installed on the traveling drive unit frame (21), and the elevating guide shaft (38) of the fork unit (30) may be inserted into the elevating guide bush (25). The elevating guide bush (25) may be composed of a total of four which are disposed adjacent to the inside of each rack jack (24) in the X-axis direction.

The sensor support (26) may be installed on the traveling drive unit frame (21) in the Z-axis direction, and the elevating regular position sensor (27) and the elevating limit sensors (28, 29) may be attached to the sensor support (26).

The elevating regular position sensor (27) (or elevating origin sensor) may be installed toward the upper end of the sensor support (26) to confirm origin operation or operation completion of the fork unit (30). The elevating regular position sensor (27) may be a horseshoe sensor.

The elevating limit sensors (28, 29) may be installed toward the upper end and toward the lower end of the sensor support (26) to stop the fork unit (30) while generating an alarm when the limit thereof is exceeded. The elevating limit sensors (28, 29) may be composed of an elevating ascent limit sensor (28) and an elevating descent limit sensor (29). The elevating limit sensor (28, 29) may be a limit switch sensor.

Referring to FIGS. 4a, 4b, and 4c, the fork unit (30) may be composed of a fork unit frame (31), an orthogonal robot (32), a fork arm (33a), a fork (33b), a box cover cylinder (34a), and a box detection sensor (35), a distance sensor (36), a chucking sensor (37), an elevating guide shaft (38), a sensor support (39a), an elevating origin sensor (39b), and an elevating limit sensor (39c).

The fork unit (30) may be installed on the lower part of the traveling drive unit (20) and the upper part of the conveyor unit (50), and may chuck the cover (3b) of the position-adjusted box (3) in the X-axis direction, and may also chuck the bobbin loaded in the box (3) in the X-axis direction.

The fork unit frame (31) forms a basic skeleton, which may consist of a rectangular plate-like structure, and move up and down in the Z-axis direction as its upper end is connected to the lower end of the rack jack (24) of the traveling drive unit (20).

The orthogonal robot (32) is for linear reciprocation of the chucking member in the X-axis direction, which may be movably installed on the lower part of the fork unit frame (31) in the X-axis direction. The orthogonal robot (32) may comprise a motor for movement in the X-axis direction when chucking the bobbin (1). The orthogonal robot (32) may be composed of two robots, each of which are disposed at both ends of the fork unit frame (31) in the X-axis direction.

The fork arms (33a) may be installed on the lower parts of both orthogonal robots (32) in the Z-axis direction, respectively, to support the fork (33b) and the box cover cylinder (34a). The fork arm (33a) may linearly reciprocate in the X-axis direction along the orthogonal robot (32).

The forks (33b) may be installed inside the lower ends of both fork arms (33a) in the X-axis direction, respectively, to chuck the bobbin (1). The forks (33b) may be inserted into the open hollow ends (1a) of both ends of the bobbin (1) to chuck the bobbin (1), and may linearly reciprocate in the X-axis direction along the fork arm (33a).

The box cover cylinders (34a) are cylinders for movement in the X-axis direction when chucking the box cover (3b), which may be installed in the middles of both fork arms (33a) in the X-axis direction, respectively, to chuck the box cover (3b). The box cover cylinder (34a) may be provided with a cylinder rod (34b) disposed outside the fork arm (33a), a cover pusher (34c) disposed inside the fork arm (33a), and a connecting member (34d) for connecting the cylinder rod (34b) and the cover pusher (34c). The box cover cylinder (34a) may be a pneumatic cylinder.

The cylinder rod (34b) may linearly reciprocate in the X-axis direction from the outside of the fork arm (33a), and the cover pusher (34c) connected to the cylinder rod (34b) through the connecting member (34d) may linearly reciprocate in the X-axis direction from the inside of the fork arm (33a). Therefore, the cover pusher (34c) may linearly reciprocate in the X-axis direction autonomously regardless of the movement of the fork arm (33a).

FIG. 4 shows a state where the cover pusher (34b) is most advanced to the inside of the fork arm (33a), that is, a state of chucking the box cover (3b), where it may move backward to come into close contact with the fork arm (33a) in order not to interfere with chucking the bobbin (1) of the fork (33b) when the bobbin (1) is chucked.

The box detection sensor (35) may be installed on the inside site of the fork arm (33a) among the connecting members (34d) of both box cover cylinders (34a) to sense the box cover (3b). The box detection sensor (35) is required for X-axis centering of the fork unit (30) when the box cover (3b) is chucked. The box detection sensor (35) may be a photoelectric sensor.

The distance sensor (36) may be installed on the lower part of both orthogonal robots (32) to the inside of both fork arms (33a) to sense the distance (height) between the bobbin (1) and the box cover (3b), and may determine whether there is an elevating height error. The distance sensor (36) is required for Z-axis centering of the fork unit (30) in conjunction with the barcode reader when the box cover (3b) is chucked and the bobbin (1) is chucked. The distance sensor (36) may be an ultrasonic sensor.

The chucking sensors (37) may be installed at the lower ends of both fork arms (33a) to sense chucking of the bobbin (1). The chucking sensor (37) is required for X-axis centering of the fork unit (30) when the bobbin (1) is chucked. The chucking sensor (37) may be a proximity sensor.

The elevating guide shaft (38) is installed on the upper part of the fork unit frame (31) in the Z-axis direction to serve as a guide when the fork unit (30) elevates. Four elevating guide shafts (38) may be inserted into the four elevating guide bushes (25) of the traveling drive unit (20), respectively.

The sensor support (39a) may be installed on the upper part of the fork unit frame (31) in the Z-axis direction, and an elevating regular position sensor (39b) and an elevating limit sensor (39c) may be attached to this sensor support (39a).

The elevating regular position sensor (or elevating origin sensor) (39b) may be installed toward the upper end of the sensor support (39a) to confirm origin operation or operation completion of the fork unit (30). The elevating regular position sensor (39b) may be a horseshoe sensor.

The elevating limit sensors (39c) may be installed toward the upper end and toward the lower end of the sensor support (39a), respectively, to stop the fork unit (30) while generating an alarm when the limit thereof is exceeded. The elevating limit sensor (39c) may be composed of an elevating ascent limit sensor and an elevating descent limit sensor. The elevating limit sensor (39c) may be a limit switch sensor.

The sensor support (39a), the elevating regular position sensor (39b), and the elevating limit sensor (39c) may be omitted, when the sensor support (26), the elevating regular position sensor (27), and the elevating limit sensors (28, 29) are installed to the traveling drive unit (20). That is, the sensor support, the elevating regular position sensor, and the elevating limit sensor may be installed in only any one unit of the traveling drive unit (20) and the fork unit (30), and may also be installed in both units.

Referring to FIGS. 5*a*, 5*b*, and 5*c*, the centering unit (40) may be composed of a centering unit frame (41), a Y-axis cylinder (42), a moving plate (43), an X-axis cylinder (44), a box pusher (45), an LM guide (46), a size check sensor (47), and the like.

The centering unit (40) may be installed outside the conveyor unit (50) in the X-axis direction to adjust (center, align) the position of the box (3) in the X-axis direction and the Y-axis direction. Regarding the centering sequence, first, the X-axis centering may be performed, and then the Y-axis centering may be performed.

The centering unit frame (41) forms a basic skeleton, which may consist of an approximately rectangular plate-like structure, and may be installed on both sides of the outer side of the conveyor unit (50) in the X-axis direction.

The Y-axis cylinders (42) may be installed on both centering unit frames (41) in the Y-axis direction to reciprocate the box pusher (45) in the Y-axis direction. The rod of the Y-axis cylinder (42) may be connected to the lower part of the moving plate (43). The Y-axis cylinder (42) may be a pneumatic cylinder.

The moving plate (43) may be connected to the rods of both Y-axis cylinders (42) to reciprocate in the Y-axis direction. The moving plate (43) may have a rectangular plate-like structure, and may be connected to the end of the rod of the Y-axis cylinder (42). The X-axis cylinder (44) may be installed on the upper part of the moving plate (43).

The X-axis cylinder (44) may be installed on both moving plates (43) in the X-axis direction to reciprocate along with the moving plate (43) in the Y-axis direction. The rod of the X-axis cylinder (44) may be connected to the box pusher (45) to move the box pusher (45) in the X-axis direction. The X-axis cylinder (44) may be a pneumatic cylinder.

As the box pusher (45) reciprocates in the Y-axis direction and the X-axis direction by the Y-axis cylinder (42) and the X-axis cylinder (44), respectively, it may center the box (3) in contact with the box (3). The box pusher (45) may be disposed long in the X-axis direction, wherein the outside end in the X-axis direction may be connected to the LM guide (46) installed on the moving plate (43), and the Y-axis front end of the box pusher (45) among the inside ends in the X-axis direction may be connected to the rod end of the X-axis cylinder (44), and a pad may be attached to the Y-axis rear end of the box pusher (45) among the inside ends in the X-axis direction. In FIG. 5, the box pusher (45) is in the most advanced state in the Y-axis direction and the X-axis direction, respectively.

The LM guides (46) may be installed on both centering unit frames (41) and the moving plate (43), respectively, to guide movement in each axial direction. The LM guide (46) may be installed in the centering unit frame (41) in the Y-axis direction, and connected to the lower part of the moving plate (43). In addition, the LM guide (46) may be installed on the moving plate (43) in the X-axis direction, and connected to the upper part of the moving plate (43) and the lower part of the box pusher (45), respectively.

The size check sensor (47) may be installed on the upper part of the centering unit frame (41) to check the size of the box (3). The size check sensors (47) may be composed of a plurality of sensors, for example, 5 sensors, as shown in the drawings, and the intervals between the respective sensors may gradually become narrower toward the rear end of the Y-axis. The size check sensor (47) may be a light transmitting/receiving sensor. The size check sensor (47) may be supported on the centering unit frame (41) by an appropriate support means (bracket, support, etc.).

Referring to FIG. 6, the conveyor unit (50) may be composed of a free roller lane (51), a box stopper (52), a cargo alignment sensor (53), an entry guide block (54), a transport vehicle end stopper (55), and the like.

The conveyor unit (50) is a conveyor used when adjusting the position of the box (3), and is installed at the front end of the transfer device, thereby being a place where the box (3) is first disposed and the transfer begins.

The free roller lane (51) is for movement of the box (3) in the Y-axis direction, wherein the free roller is not driven by itself, but is capable of freely rotating by external force. The free roller lane (51) may be composed of a plurality of lanes arranged in the Y-axis direction, for example, three lanes, as shown in the drawings. Specifically, main roller lanes may be disposed at both ends in the X-axis direction, and auxiliary roller lanes having a smaller width than that of the main roller lane may be disposed in the center. A space between the main roller lane and the auxiliary roller lane may be a space for a transport vehicle (forklift, carriage, etc.) to enter. Each lane (51) may be equipped with a plurality of free rollers, for example, eight free rollers, as shown in the drawings.

The box stopper (52) is for Y-axis centering of the box (3), which may be installed at the rear end of the Y-axis of both main roller lanes among the free roller lanes (51). The box stopper (52) may be an approximately plate-like structural object disposed in the Z-axis direction. The Y-axis centering may be performed while the box disposed on the free roller lane (51) is pushed in the Y-axis direction by the centering unit (40) to bring the box (3) into close contact with the box stopper (52).

The cargo alignment sensor (or box end sensor) (53) may be disposed adjacent to the box stopper (52) at the rear end of the Y-axis of both main roller lanes among the free roller lanes (51), and confirm whether the box (3) is positioned in contact with the box stopper (52), that is, recognize whether the loaded cargo (box) is aligned. The cargo alignment sensor (53) may be a direct reflection sensor.

The entry guide block (54) may be installed at the front end of the Y-axis of the auxiliary roller lane among the free roller lanes (51) to guide the entry path of the transport vehicle (carriage, etc.).

The transport vehicle end stopper (55) may be disposed adjacent to the box stopper (52) to prevent a collision between the transport vehicle (forklift, etc.) and the box cover rack (90). The transport vehicle end stopper (55) may be a plate-like structural object disposed in the Z-axis direction, and may be disposed inside both box stoppers (52) on the same line as the box stopper (52).

Referring to FIGS. 7*a* and 7*b*, the bobbin stacking stand (60) may be composed of a stacking stand frame (61), a guide block (62), a cargo detection sensor (63), a bobbin detection sensor (64), a transport vehicle end stopper (65), and the like.

The bobbin stacking stand (60) is a place where the bobbin (1) is placed, which may be installed at the rear end of the Y-axis of the main frame unit (10).

The stacking stand frame (61) forms a basic skeleton, which may consist of a three-dimensional structure in the form of a hexahedron.

The guide block (62) may be installed on the upper part of the stacking stand frame (61) to prevent the bobbin (1) from being pushed in the axial direction. The guide blocks (62) may be disposed in the Y-axis direction at both ends of the X-axis direction among the upper ends of the stacking stand frame (61), and may comprise two inclined surfaces facing each other at the center.

The cargo detection sensor (63) may be installed on the upper part of the stacking stand frame (61) to determine whether there is a loaded cargo (bobbin) in the stacking stand frame (60). The cargo detection sensors (63) may be arranged to cross each other in the diagonal direction at both ends in the X-axis direction among the upper ends of the stacking stand frame (61). The cargo detection sensor (63) may be a light transmitting/receiving sensor.

The bobbin detection sensor (64) may be installed on the guide block (62) to determine whether there is the bobbin (1) in the guide block (62). The bobbin detection sensors (64) may be installed at both ends of the guide block (62) in the Y-axis direction, respectively. The bobbin detection sensor (64) may be a photoelectric sensor.

The transport vehicle end stopper (65) may be installed at the rear end of the Y-axis of the stacking stand frame (61) to prevent a collision between the transport vehicle (forklift, carriage, etc.) and the bobbin stacking stand (60). The transport vehicle end stopper (65) may be an approximately plate-like structural object disposed in the Z-axis direction, and for example, two may be installed.

Referring to FIG. 8, the cover assembly (70) may be composed of a cover assembly frame (71), a ladder (72), a safety door (73), and the like.

The cover assembly (70) is installed on the top and side surfaces of the main frame unit (10), and collectively refers to the guardrail above the transfer device facility, the ladder, and the safety door.

The cover assembly frame (71) forms a basic skeleton, which may consist of a three-dimensional structure in the form of a hexahedron.

The ladder (72) may be installed on the side surface of the cover assembly frame (71) to provide a movement path during upper maintenance, that is, which may be a passage to go up to the upper part of the transfer device facility during maintenance.

The safety door (73) may be installed on the side surface of the cover assembly frame (71) and the lower part of the ladder (72). When the safety door (73) is opened, the operation of the transfer device facility may stop due to interlocking.

Referring to FIG. 9, the entry guide (80) may be composed of an entry guide frame (81), a roller (82), a pad (83), and the like.

The entry guide (80) is installed at the entrance of the main frame unit (10) to guide the path of the transport vehicle (carriage, etc.) when the box (3) is put in.

The entry guide frame (81) forms a basic skeleton, which may consist of a three-dimensional structure. The entry guide frame (81) may be disposed toward the front end of both centering units (40) in the Y-axis direction, and may be provided with a plate-like structural object disposed in the Z-axis direction, and a support for supporting the plate-like structural object.

The roller (82) may be installed inside the entry guide frame (81) in the Z-axis direction to prevent friction between the transport vehicle (carriage, etc.) and the entry guide (80). The roller (82) may be composed of a plurality of rollers, for example, three rollers, as shown in the drawings.

The pad (83) may be installed toward the front end of the entry guide frame (81) to prevent damage to the transport vehicle (carriage, etc.) and the entry guide (80). The pad (83) may be made of stainless steel (SUS).

Referring to FIG. 10, the box cover stacking stand (90) may be composed of a stacking stand frame (91), a centering cylinder (92), an end bracket (93), a seating detection sensor (94), and the like.

The box cover stacking stand (90) is a place where the box cover (3b) is placed, which may be installed at an intermediate position of the transfer device, for example, between the conveyor unit (50) and the bobbin stacking stand (60).

The stacking stand frame (91) forms a basic skeleton, which may consist of a plate-like structure.

The centering cylinder (92) is a cylinder for Y-axis centering of the box cover (3b), which may be installed at both ends of the stacking stand frame (91) in the X-axis direction. The end of the rod of the centering cylinder (92) may be connected to the cover pusher disposed in the X-axis direction, and the cover pusher may reciprocate in the Y-axis direction by the centering cylinder (92). The centering cylinder (92) may be a pneumatic cylinder.

The end bracket (93) is a stopper for Y-axis centering of the box cover (3b), which may be installed at the rear end of the stacking stand frame (91) in the Y-axis direction, and two may be installed in the X-axis direction. The end bracket (93) may be a plate-like structural object disposed in the Z-axis direction. The Y-axis centering may be performed while the box cover (3b) is pushed by the cover pusher of the centering cylinder (92) to bring into close contact with the end bracket (93).

The seating detection sensors (94) may be installed at both ends of the stacking stand frame (91) in the X-axis direction to check the regular position of the box cover (3b).

Referring to FIG. 11, the maintenance frame (100) is for mounting a motor during maintenance, which may be installed on the upper part of the main frame unit (10). The maintenance frame (100) may consist of a three-dimensional structure.

The barcode reader is a device reading a barcode attached to the box (3) loaded with the bobbin (1), wherein various information of the bobbin (1) and the box (3) may be stored in the barcode. Although not shown in the drawings the barcode reader may be installed at an appropriate location among the main frame unit (10), the traveling drive unit (20), the fork unit (30), the centering unit (40), the conveyor unit (50), and the entry guide (80).

The control unit may automatically control lifting of the bobbin (1) by controlling Z-axis centering of the fork unit (30) in conjunction with the barcode reader and the distance sensor (36), X-axis centering of the fork unit (30) in conjunction with the chucking sensor (37), and Z-axis elevation and Y-axis movement of the fork unit (30), respectively.

In addition, the control unit may automatically control opening of the box cover (3b) by controlling Z-axis centering of the fork unit (30) in conjunction with the barcode reader and the distance sensor (36), X-axis centering of the fork unit (30) in conjunction with the box detection sensor (35), and Z-axis elevation and Y-axis movement of the fork unit (30), respectively.

Although not shown in the drawings, the control unit may be installed in an appropriate place, such as the main frame unit (10), and may be connected to each sensor, motor, cylinder, and the like. In addition, the control unit may be provided with an arithmetic/processing unit (CPU, MPU, etc.), a storage device (memory, drive, etc.), an input device (keyboard, mouse, button, switch, etc.), an output device (display, touch screen, etc.), and a communication device (LAN, modem, Wi-Fi, Bluetooth, etc.), a circuit board (main board, graphic card, etc.), and the like.

Hereinafter, the operating process of the transfer device according to an embodiment of the present invention will be described.

A first step is a step of opening the box cover (3b), and a second step is a primary packaging removal step. The first step may be performed automatically by the transfer device, and the second step may be performed manually by a worker.

First, the barcode attached to the box (3) is read through a barcode reader (BCR), and then the box (3) is put into the conveyor unit (50).

Next, the box (3) is automatically centered using the centering unit (40), where the control unit performs X-axis centering and Y-axis centering of the box (3) in conjunction with the BCR reading value and the box size check sensor (47).

Next, the box cover (3b) is automatically opened using the box cover cylinder (34a), and the box detection sensor (35) and the distance sensor (36) of the fork unit (30), where the control unit performs Z-axis centering of the fork unit (30) in conjunction with the BCR reading value and the distance sensor (36), and performs X-axis centering in conjunction with the box detection sensor (35). The cover pushers (34c) of both box cover cylinders (34a) advance on the inside of the X-axis to chuck the box cover (3b).

Next, through the traveling drive unit (20), the fork unit (30) ascends along the Z-axis and moves backward along the Y-axis in a state of chucking the box cover (3b), and then descends towards the box cover stacking stand (90), and releases the chucking to load the box cover (3b) on the box cover stacking stand (90). Even when the box cover (3b) is moved and the chucking is released, the control unit may interlock with the distance sensor (36) and the box detection sensor (35).

Next, the box cover (3b) is centered in the Y-axis using the centering cylinder (92) on the box cover stacking stand (90).

A third step is a step of chucking and transferring the bobbin (1), and a fourth step is a worker bobbin transfer step. The third step may be automatically performed by the transfer device, and the fourth step may be performed manually by a worker.

First, the traveling drive unit (20) and the fork unit (30), which are transfer members, move to the position of the conveyor unit (50), which is an origin.

Next, the bobbin (1) is automatically chucked and lifted using the orthogonal robot (32), and the fork (33b), the distance sensor (36) and the chucking sensor (37) of the fork unit (30), where the control unit performs Z-axis centering of the fork unit (30) in conjunction with the BCR reading value of and the distance sensor (36), and performs X-axis centering in conjunction with the chucking sensor (37). Both forks (33b) of the fork unit (30) advance on the inside of the X-axis to be inserted into the hollow ends (1a) of the bobbin (1), and simultaneously chuck the bobbin (1).

Next, through the traveling drive unit (20), the fork unit (30) ascends along the Z-axis and moves backward along the Y-axis in a state of chucking the bobbin (1), and then descends from the bobbin stacking stand (60), and releases the chucking to load the bobbin (1) on the bobbin stacking stand (60). Even when the bobbin (1) is moved and the chucking is released, the control unit may interlock with the distance sensor (36) and the chucking sensor (37).

Next, the fork unit (30) moves to the position of the box cover stacking stand (90), which is a standby position.

Next, a worker transfers the bobbin (1) loaded on the bobbin stacking stand (60) using a transport vehicle.

A fifth step is a step of returning the box cover (3b), and a sixth step is an empty box recovery step. The fifth step may be automatically performed by the transfer device, and the sixth step may be performed manually by a worker.

First, the fork unit (30) moves to the box cover position, which is in the middle position of the transfer device.

Next, the fork unit (30) chucks the box cover (3b) in a state of being centered to the Y-axis through the centering cylinder (92) on the box cover stacking stand (90), in the same manner as the above-described method, through the Z-axis centering and the X-axis centering.

Next, through the traveling drive unit (20), the fork unit (30) ascends along the Z-axis and moves forward along the Y-axis in a state of chucking the box cover (3b), and then descends from the conveyor unit (50), and releases the chucking to reassemble the box cover (3b) with the empty box body (3a) without the bobbin (1).

Next, the fork unit (30) moves to the position of the box cover stacking stand (90), which is a standby position.

Finally, a worker transfers and collects the reassembled empty box (3) from the conveyor unit (50) using a transport vehicle.

EXPLANATION OF REFERENCE NUMERALS

1: bobbin, 1a: hollow end, 2: foil, 3: box, 3a: box body, 3b: box cover;

10: main frame unit, 11: main frame, 12: light curtain sensor, 13: cableveyor, 14: LM guide, 15: traveling regular position sensor, 16: traveling backward limit sensor, 17: traveling forward limit sensor;

20: traveling drive unit, 21: traveling drive unit frame, 22: traveling motor, 23: elevating motor, 24: rack jack, 25: elevating guide bush, 26: sensor support, 27: elevating regular position sensor, 28: elevating ascent limit sensor, 29: elevating descent limit sensor;

30: fork unit, 31: fork unit frame, 32: orthogonal robot, 33a: fork arm, 33b: fork, 34a: box cover cylinder, 34b: cylinder rod, 34c: cover pusher, 34d: connecting member, 35: box detection sensor, 36: distance sensor, 37: chucking sensor, 38: elevating guide shaft, 39a: sensor support, 39b: elevating origin sensor, 39c: elevating limit sensor;

40: centering unit, 41: centering unit frame, 42: Y-axis cylinder, 43: moving plate, 44: X-axis cylinder, 45: box pusher, 46: LM guide, 47: size check sensor;

50: conveyor unit, 51: free roller lane, 52: box stopper, 53: cargo alignment sensor, 54: entry guide block, 55: transport vehicle end stopper;

60: bobbin stacking stand, 61: stacking stand frame, 62: guide block, 63: cargo detection sensor, 64: bobbin detection sensor, 65: transport vehicle end stopper;

70: cover assembly, 71: cover assembly frame, 72: ladder, 73: safety door;

80: entry guide, 81: entry guide frame, 82: roller, 83: pad;

90: box cover stacking stand, 91: stacking stand frame, 92: centering cylinder, 93: end bracket, 94: seating detection sensor;

100: maintenance frame.

The invention claimed is:

1. A transfer device comprising:

a barcode reader configured to read a barcode coupled to a box, the box being arranged to accommodate a bobbin including raw materials, wherein the box includes a cover;

a conveyor unit configured to move the box;

a centering unit installed outside the conveyor unit and configured to adjust a position of the box along a width direction and along a longitudinal direction;

a fork unit installed on an upper part of the conveyor unit and configured to chuck the cover along the width direction, wherein the fork unit includes a box cover cylinder, a box detection sensor, and a distance sensor, wherein the box cover cylinder is configured to move along the width direction when the cover is chucked, wherein the box detection sensor is configured to sense the cover, and wherein the distance sensor is configured to sense a distance between the cover and the distance sensor;

a traveling drive unit coupled to a top of the fork unit and configured to elevate the fork unit along a height direction, wherein the traveling drive unit is configured to move the fork unit along the longitudinal direction; and a control unit configured to automatically control opening of the cover by controlling:

centering of the fork unit along the height direction in conjunction with the barcode reader and the distance sensor;

centering of the fork unit along the width direction in conjunction with the box detection sensor, and movement of the fork unit along the height direction and the longitudinal direction.

2. The transfer device according to claim 1, wherein the conveyor unit comprises:

a free roller lane configured to receive the box being transported along the longitudinal direction;

a box stopper installed at a rear end of the free roller lane along the longitudinal direction, so as to center the box along the-longitudinal direction;

a cargo alignment sensor disposed adjacent to the box stopper and configured to sense whether the box is in contact with the box stopper;

an entry guide block installed at a front end of the free roller lane along the longitudinal direction, so as to guide an entry path of a transport vehicle; and a transport vehicle end stopper disposed adjacent to the box stopper, so as to prevent a collision between the transfer device and the transport vehicle.

3. The transfer device according to claim 1, wherein the centering unit comprises:

a box pusher configured to contact the box, so as to center the box;

a first cylinder connected to the box pusher and configured to move the box pusher along the width direction;

a moving plate on which the first cylinder is installed;

a second cylinder connected to the moving plate and configured to move the box pusher along the longitudinal direction;

a linear motion guide connected to the moving plate to guide movement along the longitudinal and width directions;

a centering unit frame accommodating the second cylinder; and a size check sensor installed on an upper part of the centering unit frame and configured to sense a size of the box.

4. The transfer device according to claim 1, wherein the fork unit comprises:

a fork unit frame having a plate structure;

a robot provided with a motor, installed on a lower part of the fork unit frame, and configured to be movable in the width direction;

a fork arm installed on a lower part of the robot;

a fork installed on a lower end of the fork arm and configured to chuck the bobbin, wherein the fork is disposed between the fork arm and a center plane of the fork unit extending in the height direction;

the box cover cylinder-provided with a cylinder rod, a cover pusher, and a connecting member, wherein the cylinder rod is disposed so as to extend beyond a terminal edge of the fork arm in the width direction, wherein the cover pusher is disposed between the fork arm and the center plane, and a connecting member connects the cylinder rod and the cover pusher;

the box detection sensor installed on the connecting member;

the distance sensor-installed on the lower part of the robot, wherein the distance sensor is disposed between the fork arm and the center plane;

a chucking sensor installed at the lower end of the fork arm;

an elevating guide shaft installed on an upper part of the fork unit frame;

a first sensor support installed on a side surface of the fork unit frame and extending beyond the upper part of the fork unit frame in the height direction; and a first elevating regular position sensor and a first elevating limit sensor installed on the first sensor support.

5. The transfer device according to claim 4, wherein the traveling drive unit comprises:

a traveling drive unit frame having a plate structure;

a traveling motor installed on an upper part of the traveling drive unit frame and configured to move the traveling drive unit frame along the longitudinal direction;

an elevating motor installed on the upper part of the traveling drive unit frame and configured to move the fork unit in the height direction;

a rack jack coupled to the traveling drive unit frame and the fork unit, wherein the rack jack is configured to pass through the traveling drive unit frame in the height direction, wherein the rack jack is configured to convert rotation of the elevating motor into linear motion so as to move the fork unit along the height direction;

an elevating guide bush installed in the traveling drive unit frame, and configured to receive the elevating guide shaft of the fork unit;

a second sensor support installed in the traveling drive unit frame in the height direction; and a second elevating regular position sensor and a second elevating limit sensor installed on the second sensor support.

6. The transfer device according to claim 5, further comprising a main frame unit; wherein the main frame unit comprises:

a three-dimensional main frame;

a light curtain sensor installed on a side of the main frame and configured to interlocked the control unit during maintenance;

a cableveyor installed on an upper part of the main frame to guide cables;

a linear motion guide installed on the upper part of the main frame and connected to the traveling drive unit frame to guide the traveling drive unit frame along the longitudinal direction; and a traveling regular position sensor and a traveling limit sensor installed on the upper part of the main frame.

7. The transfer device according to claim 6, further comprising a bobbin stacking stand installed at a rear end of the main frame unit along the longitudinal direction and configured to receive the bobbin thereon; wherein the bobbin stacking stand comprises:

a three-dimensional stacking stand frame;

a guide block installed on an upper part of the three-dimensional stacking stand frame to prevent movement of the bobbin in the longitudinal or width directions;

a cargo detection sensor installed on the upper part of the three-dimensional stacking stand frame and configured to sense whether the bobbin is in the bobbin stacking stand;

a bobbin detection sensor installed on the guide block to sense whether the bobbin is in the guide block; and a transport vehicle end stopper installed toward a rear end of the three-dimensional stacking stand frame along the longitudinal direction, so as to prevent a collision between the transport vehicle and the three-dimensional stacking stand.

8. The transfer device according to claim 6, further comprising a cover assembly installed on both a top surface and a side surfaces of the main frame unit; wherein the cover assembly comprises:

a three-dimensional cover assembly frame;

a ladder installed on a side surface of the three-dimensional cover assembly frame, so as to provide a movement path; and a safety door installed on the side surface of the three-dimensional cover assembly frame.

9. The transfer device according to claim 6, further comprising an entry guide installed at an entrance of the main frame unit, so as to guide a path of a transport vehicle; wherein the entry guide comprises:

a three-dimensional entry guide frame;

a roller installed in the height direction and accommodated inside the three-dimensional entry guide frame; and a pad installed toward a front end of the three-dimensional entry guide frame.

10. The transfer device according to claim 6, further comprising a maintenance frame installed on the upper part of the main frame unit and configured to receive a motor.

11. The transfer device according to claim 1, further comprising a box cover stacking stand installed at a rear end of the conveyor unit in the longitudinal direction; wherein the box cover stacking stand comprises:

a stacking stand frame having a plate structure;

centering cylinders installed at both ends of the stacking stand frame in the width direction and configured to center the cover in the longitudinal direction;

an end bracket installed at a rear end of the stacking stand frame along the longitudinal direction, so as to center the cover in the longitudinal direction; and seating detection sensors installed at both ends of the stacking stand frame in the width direction and configured to sense a position of the cover.

\* \* \* \* \*